United States Patent [19]

Weber

[11] Patent Number: 4,981,004

[45] Date of Patent: Jan. 1, 1991

[54] BAR-TYPE CONSTRUCTIONAL ELEMENT OF HIGH FLEXURAL STRENGTH AND APPLICATION OF SAME

[76] Inventor: Hans R. Weber, 10, chemin du Grillon, CH-1007 Lausanne, Switzerland

[21] Appl. No.: 373,515

[22] Filed: Jun. 30, 1989

[30] Foreign Application Priority Data

Jul. 1, 1988 [CH] Switzerland ............ 2513/88

[51] Int. Cl.$^5$ ............................................. E04C 3/30
[52] U.S. Cl. ........................................ 52/727; 52/730; 52/729
[58] Field of Search .................. 52/227, 228, 229, 230

[56] References Cited

U.S. PATENT DOCUMENTS

| | | | |
|---|---|---|---|
| 15,237 | 11/1821 | Jagdmann | 52/227 X |
| 154,393 | 8/1874 | Hill | 52/227 |
| 2,244,489 | 6/1941 | Downes | 52/228 |
| 2,781,657 | 2/1957 | Taylor | 52/227 |
| 4,509,305 | 4/1985 | Guinard | 52/227 X |

Primary Examiner—David A. Scherbel
Assistant Examiner—Linda J. Hoffert
Attorney, Agent, or Firm—Sherman and Shalloway

[57] ABSTRACT

In the fields of mechanical engineering and toolmaking there is a frequent requirement for light but very strong constructional elements of high flexural strength, particularly as constructional components with minimum flexure despite unsupported free lengths. In the case of measurement instruments, for example, there is the problem that the rail (1) must, if possible, suffer no flexure even if used completely unsupported and with external forces acting upon it, if the reading is not to be incorrect. To this end, a constructional element in accordance with the invention with a plurality of bodies (2) made of, for example, ceramics which are connected using prestressing devices (3) or adhesives to form a rigid constructional component is presented. This structure prevents the ceramic elements from fracturing as a result of excessive bending moments since they can tilt or slide relative to each other. The bodies (2) and prestressing devices (3) can be placed in a block which may be provided with external cladding, whether partial or whole.

7 Claims, 1 Drawing Sheet

BAR-TYPE CONSTRUCTIONAL ELEMENT OF HIGH FLEXURAL STRENGTH AND APPLICATION OF SAME

BACKGROUND OF THE INVENTION

1. Field of the Invention:

The present invention relates to a bar-type constructional element of high flexural strength containing at least one component for absorbing forces or bending moments.

2. Description of the Prior Art:

In the construction of mechanical designs, particularly in the fields of mechanical engineering and toolmaking, it is often necessary to use constructional elements of high flexural strength, i.e. riqid elements, which exhibit minimum flexure even when long horizontal extensions and, in particular, long, free, unsupported lengths are involved. Pipes, struts and trelliswork are generally regarded as rigid constructional elements. Such conventional rigid constructional elements are, however, unsuitable for many applications since they are too heavy or are too expensive to manufacture. Glassor carbon-fibre-reinforced plastics are used in the manufacture of light, rigid constructional elements although the former also do not produce satisfactory results in every case because of their occasionally disadvantageous temperature coefficients and their residual flexibility which is an inherent material property. On the other hand, such fibre-reinforced plastics are used precisely in the manufacture of components in which flexibility is desired, e.g. skis and glider wings. Other rigid constructional elements are prestressed components which are generally in the form of solid structures, for example made of concrete, which are prestressed by means of steel cables or rods. They are not generally suitable for mechanical engineering and toolmaking and are principally used in building and bridge construction. Ceramics are intrinsically suitable for light, rigid components of great strength, although ceramic components have the disadvantage that they fracture relatively easily with excessive loading and are also susceptible to impact loads. They therefore have only limited applicability in mechanical engineering and toolmaking.

SUMMARY OF THE INVENTION

It is an object of the present invention to create a bar-type constructional element of high flexural strength which avoids the disadvantages of the constructional elements of this type known in the art and which, taking due account of the forces acting on it, has an optimum cross-sectional profile with minimum weight and mass without being at risk of fracturing if subjected to excessive loading or impact loads, and which further can be mass-produced economically and avoids the disadvantages of the elements of this type known in the art.

In accordance with the invention there is provided a bar-type constructional element of high flexural strength, containing at least one component for absorbing forces or bending moments, wherein the component has at least a core of ceramics or ceramic-like material.

In view of the fact that the second moment of inertia of a rectangular cross-section increases with the cube of its height it can be advantageous to select as a constructional element in accordance with the invention an element of great height and small width. The flexure of such an element when subjected to a force is inversely proportional to its modulus of elasticity. It is therefore advisable to select a material with a high modulus of elasticity and a low density. On the basis of these criteria ceramics or ceramic-like materials appear suitable. The generic term ceramics covers a variety of materials with different properties adapted to the particular application, which properties range from being an almost perfect insulator to a superconductor. Most applications exploit their high temperature resistance, the good wear properties or the high electrical resistance. For the application proposed below the high flexural strength, high modulus of elasticity, high compression strength, linear thermal expansion coefficient and low density are principally of interest. However, the disadvantages of these materials, mainly connected with their tendency to fracture when subjected to excessive loads, must be compensated for by suitable design features of the invention.

BRIEF DESCRIPTION OF THE DRAWING FIGURES

Advantageous embodiments of the invention will be described below with reference to the drawing, in which.

DETAILED DESCRIPTION OF THE INVENTION

Figure 1:
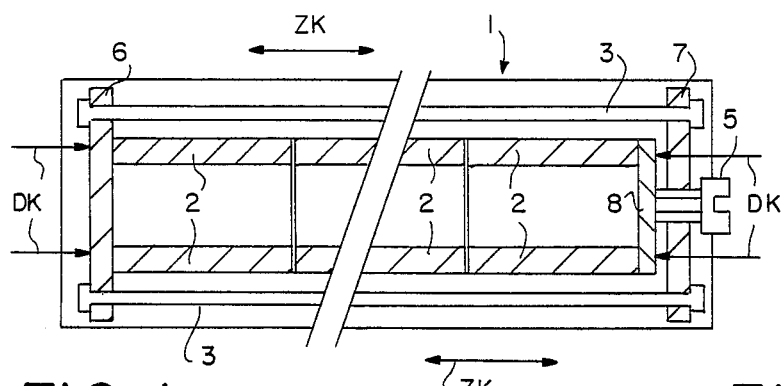
FIG. 1 is a longitudinal cross-section through a bar-type constructional element in accordance with the invention in the form of a rail for length-measuring instruments.

The rail 1 shown in FIG. 1 consists of a plurality of bodies 2 of rectangular cross-section made of ceramics or ceramic-like material which are arranged in a line and, in the preferred embodiment, hollow. The row of bodies made of individual ceramic parts with their face ends advantageously ground flat forms a constructional component of high compression strength and low density which is held together by prestressing devices of high tensile strength to form a rigid body. To this end, in the embodiment of a bar-type constructional element shown, a first end plate 6 is directly connected to the last body 2 at one end of the row of bodies, at the left-hand end in the drawing. Prestressing steel rods 3 are anchored in the end plate 6 such that the end plate 6 serves a force transmission element which transfers the compression forces DK generated by the prestressing of the prestressing steel rods 3 to the bodies 2. At the other end of the row of bodies a second end plate 7 is either directly connected to the last body 2 or, as shown in the drawing, via an adjustment device, for example in the form of a screw 5, which presses against a cover plate 8 located flush against the last body 2. Like the first end plate 6, the second end plate 7 serves as an anchorage for the prestressing steel rods 3. The compression forces DK occurring between the end plates 6 and 7 which are generated by the prestressing of the prestressing steel rods 3 are transmitted on this side of the line of bodies via a screw 5 located in a thread in the second end plate 7 to the cover plate 8 such that the individual bodies 2 are clamped between the end plate 6 and the cover plate 8, forming a solid, rigid constructional component.

The prestressing devices, in this case in the form of prestressing steel rods 3, must not necessarily act via adjustment devices, in this case in the form of the screw 5 and the cover plate 8, on the bodies 2 since the second end plate 7 can be located directly on the last body 2 a with the first end plate 6. The advantage of using adjustment devices, however, is that possible uneven tensions in the prestressing devices, in this case the two prestressing steel bars 3, can be equalised. In addition, they permit precise adjustment of the compression forces DK acting on the bodies 2. It is self-evident that the prestressing devices used to produce the tensions required to form the rigid constructional component from the adjacent bodies can differ from those described above. Depending on the type and application of the constructional element, mechanical, hydraulic, thermal or other suitable prestressing means can be used which transfer their tensile forces ZK to the row of bodies as compression forces DK in a wide variety of ways.

As mentioned above, the bodies consist of ceramics or ceramic-like material since, while having a low relative density, ceramic bodies have very great strength, especially compression strength, and great resistance to flexing stresses, especially rigidity and torsion resistance. In addition, the temperature coefficient of ceramics can be set such that it matches that of the material used for the prestressing devices, especially prestressing steel rods, with the result that the initial tension of the row of bodies remains constant over the whole relevant temperature range or that the finished constructional element has the desired temperature coefficient. Further advantages of ceramic bodies are that they can be mass produced economically and they require no mechanical treatment longitudinally. Only their face ends require treatment to ensure plane-parallel finishes. However, since ceramics are brittle, with the result that there is the danger of fracture even with minor deformations and light impact forces, it is recommended that a plurality of short bodies 2 be placed in a row in order to achieve the required length of rail 1. Since short ceramic bodies are simpler and cheaper than long ones this offers additional economic advantages. The action of unpredicted lateral forces, exceeding the flexural strength of the constructional element with its segment-like structure and resulting in a bending moment and thus a deformation of the rail 1 in one plane, i.e. in warping of the rail 1, cannot fracture the bodies 2 made of ceramics or ceramic-like material since they can tilt themselves relative to each other against the prestressing forces, i.e. the tensile forces ZK or compression forces DK acting on them longitudinally. The bar-type constructional element of the invention is thus, on the one hand, extremely rigid and torsion-resistant because of the prestressing and the materials used, while remaining light in weight, but can also, on the other hand, absorb excessive deformation forces in the form of transverse forces acting laterally on it an suffer no damage.

Figure 2:
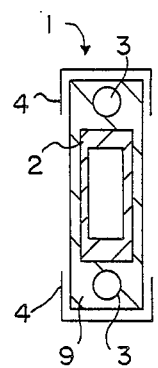
FIG. 2 is a cross-section through the bar-type constructional element of FIG. 1.
Figure 3A:
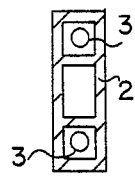
FIGS. 3a-3h show further advantageous cross-sections for bar-type constructional elements in accordance with the invention.
Figure 3B:
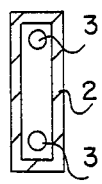
Figure 3C:
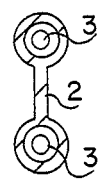
Figure 3D:
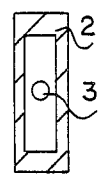
Figure 3E:
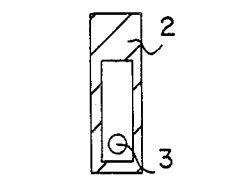
Figure 3F:
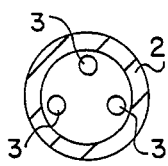
Figure 3G:
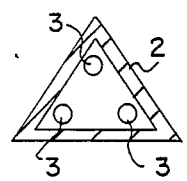
Figure 3H:
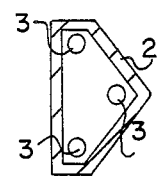

It can be seen from FIG. 2 that, if necessary, the constructional element of the invention, here the rail 1, can be formed into a block 9, in a preferred embodiment using a filler made of, for example, plastics material, especially if the element is a visible part in a machine or took, for example a rail for length-measuring instruments. In order to protect the plastic block 9, in which the bodies 2, the prestressing steel rods 3 and, if applicable, the adjustment devices 5 and 8 are embedded, against damage and, if required, to provide supplementary mechanical rigidity for the bar-type constructional element, the block 9 can be enclosed with a cladding which can be in the form of an one-piece metallic profile section or, as shown in the drawing, in the form of, for example, two metallic angle plates 4.

In the embodiment of a constructional element in accordance with the invention as described above, in this case a rail 1 for measurement instruments, the element involved is a prestressed element which essentially consists of a plurality of linearly configured bodies 2 made of ceramics or a ceramic-like material of high compression strength and low relative density with prestressing devices of high tensile strength, in this case in the form of prestressing steel rods 3. This combination in the invention of ceramic bodies with prestressing devices and, possibly, a mechanically solid cover enables the shape of the ceramic and constructional element profile to be optimised, taking due account of the forces acting on it and the total weight or mass of the constructional element, and possibly the feasibility of industrial-scale production. The adjustment devices for setting the initial stress, in this case in the form of the screw 5 and the cover plate 8, enable an optimum coordination of the initial stress of the row of bodies and the anticipated forces to be achieved. The embedding of the row of bodies and the prestressing devices in a block, for example of plastic, enables the essential components to be protected against external influences and the constructional element to be coordinated cosmetically with its intended application. Depending on the application area, the constructional element of the invention can be further provided with a single- or multi-part cover which can perform both mechanical and cosmetic functions.

Depending on the type of use for the constructional element of the invention and/or a function of the forces anticipated to be acting upon it, a different cross-section from the rectangular cross-section of the bodies 2 described above can be advantageous. It may be appropriate to use more or less than two prestressing steel rods 3 or similar prestressing devices. In FIGS. 3a–3h some advantageous cross-sections are illustrated; those in the upper row are mainly suitable for absorbing transverse forces acting in one plane only, whereas those cross-sections depicted in the lower row can absorb transverse forces acting in various directions.

The main feature of the constructional element in accordance with the invention is that it possesses optimum flexural strength with minimum weight and, thanks to its segment-like prestressed structure, does not fracture even when subjected to excessive deformation forces. It is obvious that constructional elements in accordance with the invention are suitable not only as rails for measurement instruments for large lengths, as described above, but also particularly for sliding callipers. Moreover, they can be usefully employed, with particular reference to mechanical engineering and toolmaking, wherever rigid, lightweight, linear constructional components are required. The bodies and thus the bar-type constructional elements in accordance with the invention as described above with the aid of FIGS. 3a–3h can, of course, have a different cross-section from the rectangular cross-section illustrated, depending on the transverse and deformation forces which must be anticipated. The prestressing devices can also be routed through hollow spaces in the bodies. More or less than two prestressing steel rods or similar prestressing devices can be used. The initial tension and the length of the individual bodies can be selected individually as a function of the deformation and flexing forces which are anticipated or must be withstood without damage by the constructional element. The material, ideally plastics material, used for filling or lining the constructional element of the invention, can also be selected as a function of the intended application. This also applies to the cladding which may be necessary.

Figure 4:
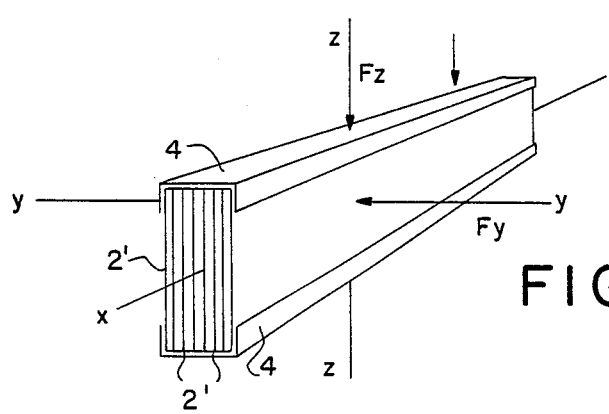
FIG. 4 is a variation of a constructional element in accordance with the invention.

FIG. 4 shows another embodiment of a constructional element in accordance with the invention. This is constructed as a composite element in which thin but tall sheet-type bodies 2' are positioned ion their sides adjacent to each other and held together by adhesive or another filler material. Since in many applications a high flexural strength has only to act in one axis, in FIG. 4 the z—z axis, it is appropriate to design the constructional element such that it can flex moderately in its y—y axis without damage, i.e. without any permanent deformation or fracture. To this end, the y—y dimension of bodies 2' is set such that they have the necessary flexibility in the y—y axis. By use of an adhesive or filler material with a certain elasticity the bodies 2' can slide over each other in their longitudinal plane x—x when a bending moment acts in the y—y axis. The consequence of these provisions is that this embodiment of the constructional element can absorb large forces Fz in its z—z axis without flexing and other forces Fy in its y—y axis without fracturing. With this embodiment of the constructional element too it is appropriated to provide a, for example, metallic cladding, possibly consisting of two or more angle plates, the latter intended to protect the corners and/or to effect precise mechanical guidance in the x—x longitudinal plane while also increasing the rigidity of the constructional element.

I claim:

1. A longitudinally extending bar-type construction element of high flexural strength comprising
    a plurality of ceramic bodies, each of said ceramic bodies having a first end face and a second end face, said plurality of ceramic bodies disposed in a linear array along a longitudinally extending axis with the respective first end faces and second end faces of adjacent bodies in contact with one another, said first and second end faces of said bodies being flat;
    a first force transmission means, disposed over and in contact with the first end face of a first ceramic body in said linear array, for applying force to said first end face of said first ceramic body;
    a second force transmission means, disposed over and in contact with the second end face of a last ceramic body in said linear array, for applying force to said second end face of said last ceramic body;
    a prestressing means, connecting said first and second force transmission means, for applying a compressive force between said first and second force transmission means.

2. The construction element according to claim 1, wherein said ceramic bodies are hollow.

3. The construction element according to claim 1, wherein said ceramic bodies are of a rectangular cross-section.

4. The construction element according to claim 1, wherein said first force transmission means comprises a first endplate disposed over and in contact with said first end face of said first ceramic body; said second force transmission means comprises a cover plate disposed over and in contact with said second end face of said last ceramic body, a second endplate disposed over said cover plate, and a screw means, mounted on said second end plate, for variably pressingly engaging said cover plate.

5. The construction element according to claim 1, wherein said prestressing means comprises at least one steel rod.

6. The construction element according to claim 1, further comprising a plastic matrix encasing said plurality of ceramic bodies, said first force transmission means, said second force transmission means and said prestressing means.

7. The construction element according to claim 6, further comprising a metallic cladding disposed over at least a portion of said plastic matrix.

* * * * *